(12) United States Patent
Keithley (10) Patent No.: US 7,701,477 B2
(45) Date of Patent: Apr. 20, 2010

(54) SYSTEM AND METHOD FOR SCALING DATA TO COMPENSATE FOR SLANTED SCANNING ON A BIDIRECTIONAL SCANNING LASER PRINTER

(75) Inventor: Douglas G. Keithley, Boise, ID (US)

(73) Assignee: Marvell International Technology Ltd. (BM)

( * ) Notice: Subject to any disclaimer, the term of this patent is extended or adjusted under 35 U.S.C. 154(b) by 222 days.

(21) Appl. No.: 12/018,559

(22) Filed: Jan. 23, 2008

(65) Prior Publication Data

US 2008/0211900 A1    Sep. 4, 2008

Related U.S. Application Data

(63) Continuation of application No. 11/118,591, filed on Apr. 28, 2005, now Pat. No. 7,333,121.

(51) Int. Cl.
    B41J 2/44    (2006.01)
(52) U.S. Cl. .................. 347/132; 347/247
(58) Field of Classification Search ........ 347/129, 347/132, 237, 247; 359/223, 225
    See application file for complete search history.

(56) References Cited

U.S. PATENT DOCUMENTS

| | | | |
|---|---|---|---|
| 5,136,412 A | 8/1992 | Makino | |
| 5,719,613 A | 2/1998 | Fukui et al. | |
| 5,737,008 A | 4/1998 | Kobayashi et al. | |
| 6,661,393 B2* | 12/2003 | Tegreene et al. | 345/7 |
| 7,190,499 B2 | 3/2007 | Deng et al. | |
| 7,333,121 B2* | 2/2008 | Keithley | 347/132 |
| 2003/0210323 A1 | 11/2003 | Turner | |
| 2004/0207715 A1 | 10/2004 | Orcutt et al. | |
| 2005/0146764 A1 | 7/2005 | Deng et al. | |

FOREIGN PATENT DOCUMENTS

| | | |
|---|---|---|
| EP | 0 464 349 A2 | 1/1992 |
| EP | 0 494 645 A2 | 7/1992 |
| JP | 2000-41147 A | 2/2000 |

OTHER PUBLICATIONS

Great Britain Search Report dated Jun. 8, 2006, in corresponding Great Britain Application No. 0606218.6, 3 pages.

* cited by examiner

Primary Examiner—Huan H Tran (57) ABSTRACT

A scanning system is adapted to scan an image beam across a photoconductive surface. The scanning system includes an oscillating mirror and is operable to generate an image beam and to reflect the image beam off the oscillating mirror to bidirectionally scan the image beam across the photoconductive surface and thereby discharge regions on the surface. The system is further operable to dynamically scale an intensity of the image beam as a function of a position of the image beam on the photoconductive surface.

24 Claims, 7 Drawing Sheets

SYSTEM AND METHOD FOR SCALING DATA TO COMPENSATE FOR SLANTED SCANNING ON A BIDIRECTIONAL SCANNING LASER PRINTER

CROSS REFERENCE TO RELATED APPLICATIONS

This application is a continuation of U.S. application Ser. No. 11/118,591, filed Apr. 28, 2005, pending, the entirety of which is incorporated herein by reference.

BACKGROUND OF THE INVENTION

Figure 1:
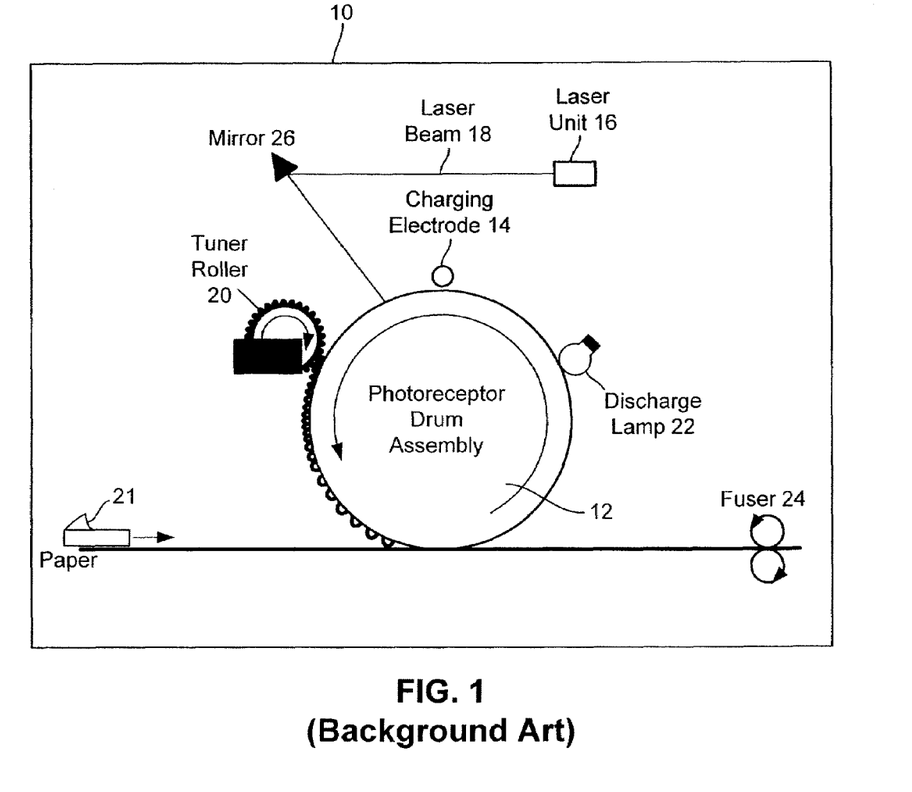
FIG. 1 is a cross-sectional view showing the primary components of a conventional laser printer.

FIG. 1 shows a typical laser printer 10 including a movable photoreceptor 12, typically a revolving photosensitive drum or cylinder. This drum 12 is made out of a highly photoconductive material that is discharged by light photons. Initially, the photoreceptor drum 12 is given a total positive charge by a charging electrode 14, typically a wire or roller having a current running through it. As the drum 12 revolves, the printer 10 uses a laser unit 16 (such as a laser diode) to shine a laser beam 18 across the surface of the drum 12 to discharge certain points. In this manner, the laser beam 18 "draws" the text and images to be printed as a pattern of electrical discharges (an electrostatic image) on the drum 12. If the laser beam 18 is modulated, resulting variations in charge on the drum 12 will ultimately be translated to proportionate amounts of toner deposited on a sheet of paper 21.

After the laser beam 18 scans the desired electrostatic pattern on the drum 12, the printer 10 uses a toner roller 20 to coat the drum 12 with positively charged toner powder. Since the toner has a positive charge, it clings to the negative discharged areas of the drum 12 that have been scanned by the laser beam, but the toner does not cling to the positively charged "background" of the drum. With the toner pattern affixed to the drum 12, the drum rolls over the sheet of paper 21 traveling below it. Before the paper 21 travels under the drum 12, the paper is given a negative charge that is stronger than the negative charge of the electrostatic image on the drum 12 so that the paper pulls the toner powder away from the drum 12. Finally, the printer 10 passes the paper 21 through a fuser 24, which is typically a pair of heated rollers and as the paper 21 passes through the fuser 24, the loose toner powder on the paper melts, fusing with the fibers in the paper and forming a permanent image on the paper. After the toner on the drum 12 is transferred to the paper 21, the drum surface passes a discharge lamp 22 that generates a bright light that exposes the entire width of the photoreceptor surface of the drum 12, erasing the electrostatic image. The drum surface then passes the charging electrode 14, which reapplies a positive charge to the surface of the drum 12 in anticipation of the laser beam 18 scanning the next image to be printed onto the drum.

Figure 2:
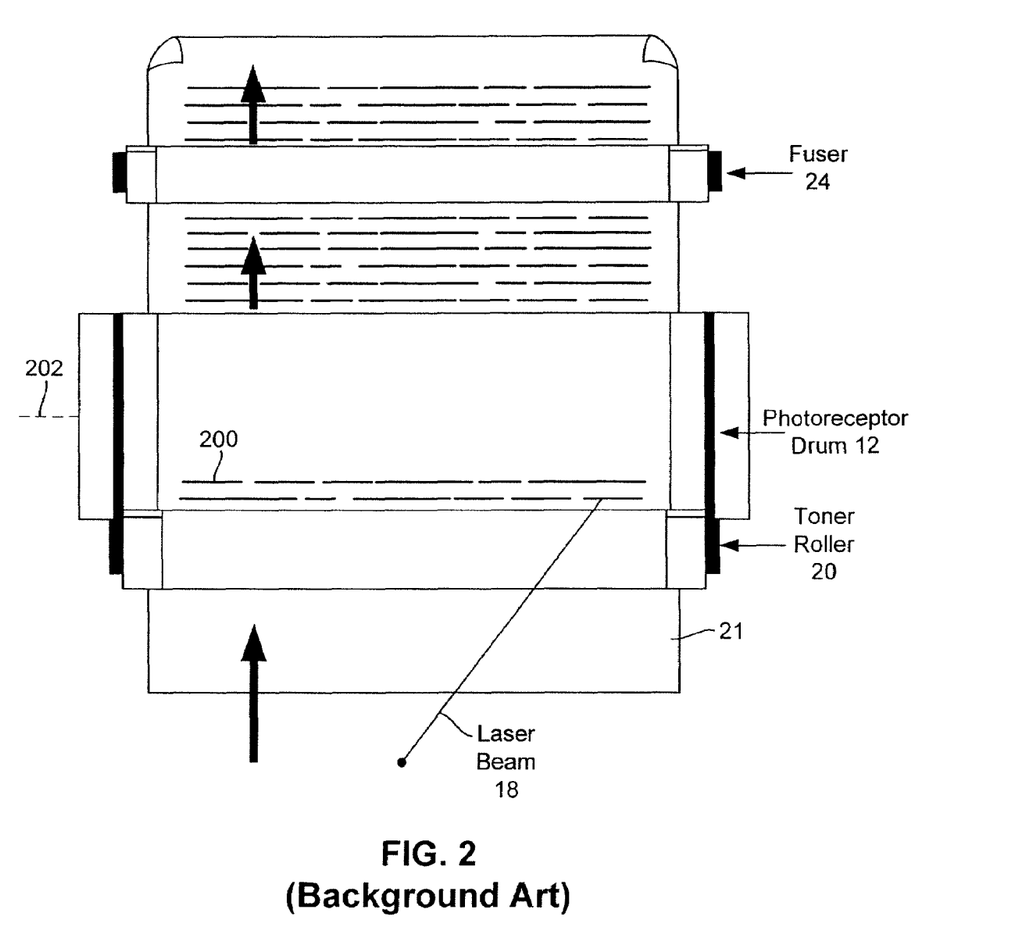
FIG. 2 is a top view of the conventional laser printer of FIG. 1 better illustrating the operation of the photoreceptor drum, laser beam, toner roller, paper, and fuser during operation of the laser printer.
Figure 3:
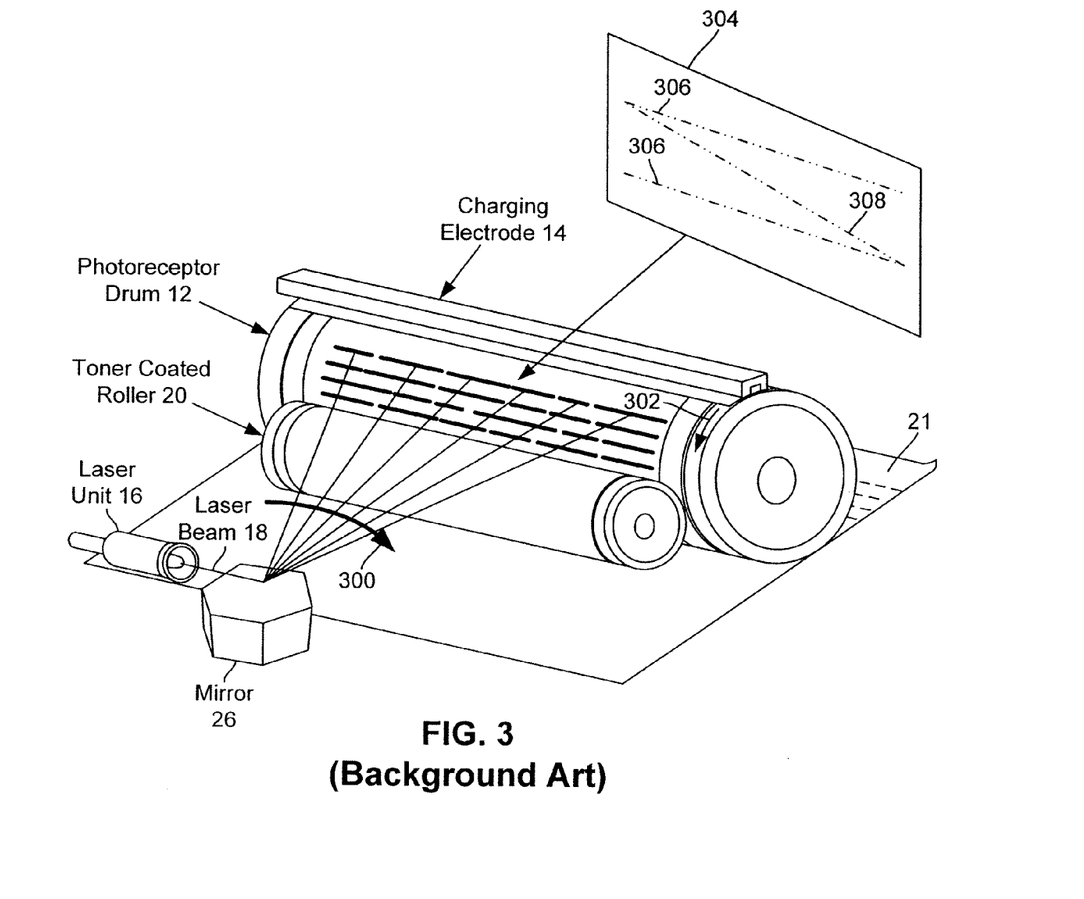
FIG. 3 is a perspective view of various components of the conventional laser printer of FIG. 1 that better illustrates the scanning of the laser beam in a horizontal direction across the drum during operation of the laser printer.

FIG. 2 is a functional top view of the printer 10 of FIG. 1 showing a number of dark areas 200 on the drum 12 that represent the negatively discharged regions, which may be alternately referred to as dots, created by the scanning laser beam 18. FIG. 3 shows a perspective view of portions of the laser printer 10 in FIG. 1 better showing the scanning of the laser beam 18 in a horizontal direction across the drum 12 as indicated by an arrow 300. Image processing circuitry (not shown) controls the laser unit 16 to modulate the laser beam 18 as the beam scans across the drum 12 in the horizontal direction 300 one line at a time. The image processing circuitry controls the laser unit 16 to turn ON and emit a pulse of light for every dot to be formed in a given horizontal line and to turn OFF where no dots are to be formed in the line. Pixel data stored in the image processing circuitry stores data for an array of pixel corresponding to the image being printed, with data for each pixel in the array corresponding to a discharge region or dot to be formed on the surface of the drum 12.

In scanning the laser beam 18 across the drum 12, the laser unit 16 does not actually move the laser beam 18 itself but instead bounces the laser beam 18 off of a movable mirror 26, such as a rotating mirror. As the mirror 26 moves, it reflects the laser beam 18 through a series of lenses (not shown) and onto the drum 12. These lenses change characteristics of the laser beam 18 to compensate for image distortion that would otherwise be caused by the varying distance between the mirror 26 and points along the drum 12. Also note that although FIGS. 2 and 3 illustrate the laser beam 18 scanning across the drum 12 in the horizontal directional, the actual scans of the laser beam are angled or "slanted" due to the movement of the drum 12 as the beam scans across the surface of the drum, as will be appreciated by those skilled in the art. For example, as the beam 18 scans from left-to-right across the surface of the drum 12, the drum is rotating in the direction indicated by an arrow 302 in FIG. 3. As a result, without any compensation scan lines of the laser beam 18 from left-to-right would be angled upward from left-to-right since the surface is moving as the beam 18 scans across that surface. The amount of slanting of the scan lines traversed by the laser beam 18 is quite small, and all scan lines have the same amount of slant. As a result, conventional printers 10 do not typically compensate for the slanting of the scan lines traversed by the laser beam 18 since the slant does not cause significant visually noticeable errors in printed pages.

Oscillating mirrors in the form of micro-electromechanical systems (MEMS) devices have become increasingly popular in various types of electronic systems. Such MEMS devices are fabricated using techniques generally used in fabricating microelectronic devices and are thus small, inexpensive, and can easily be integrated with associated electronic circuitry. As a result, the use of an oscillating mirror in place of the rotating mirror 26 in the printer 10 is desirable. A typical oscillating mirror includes a reflective portion that rotates or oscillates about pivot arms. Electronic circuitry develops electromagnetic fields that control the oscillation of the reflective portion. When an oscillating mirror is used in place of the rotating mirror 26, during a portion of the oscillation period of the mirror the laser beam 18 is reflected off the reflective portion to thereby scan the beam across the surface of the drum 12 either from left-to-right or from right-to-left. The laser beam 18 is then turned OFF as the oscillating mirror rotates to a maximum position about the pivot arms and then rotates back to a starting position, at which point the laser beam is again turned ON and modulated to form the next row of dots on the surface of the drum 12.

To use an oscillating mirror in the printer 10, the frequency of oscillation of the mirror about the pivot arms and the speed of rotation of the drum 12 must be constant for proper operation. This is true because for a given speed of rotation of the drum 12, the oscillation frequency of the mirror must scan the laser beam 18 from left-to-right across the surface of the drum and then the mirror must rotate back to an initial position such that the laser beam is ready to scan the next row of dots. After scanning a given row of dots, the time it takes the mirror to rotate back to the initial position and be positioned to scan the laser beam 18 to form the next row of dots is known as the "turnaround time" of the mirror.

Rather than being constant among mirrors, however, the oscillation frequency varies slightly from mirror to mirror. When the oscillation frequency is faster than desired, consecutive scan lines of the laser beam 18 overlap adjacent rows of dots being formed on the surface of the drum 12. In this situation, the laser beam 18 begins scanning the next row of dots prior to the drum 12 having rotated as far as desired and as far as it would have for the desired oscillation frequency of the mirror. To compensate for such variations in oscillation frequency, intensity data associated with dots being formed may be scaled to achieve the desired discharge for each dot. Since the overlap is constant for dots being formed in a given row, the intensity data of dots in adjacent columns of dots can be weighted to compensate for the overlapping scan lines. Although not discussed in detail herein, similar problems result when the oscillation frequency of the mirror is slower than desired, as will be appreciated by those skilled in the art. Also, adjusting the speed of rotation of the drum 12 as the oscillation frequency of the mirror varies is possible but is undesirable because this may adversely affect the operation of other components in the printer 10, such as the fuser 24 which may not properly fuse toner with the paper 21 if the rotational speed of the drum increases.

While the use of oscillating mirrors in laser printers 10 has advantages, such as reduced cost, such mirrors have not been commercially implemented for a number of reasons. For example, note that the operation of the oscillating mirror described above is "unidirectional" since the mirror scans the laser beam 18 only from either left-to-right or right-to-left across the surface of the drum 12. This means only half the oscillation period of the mirror is used for scanning the laser beam 18, while the other half effectively functions as the "turnaround" time of the mirror.

Because the turnaround time is approximately half the oscillation period of an oscillating mirror, the turnaround time for oscillating mirrors is relatively large when compared to the rotating mirror 26. As a result, there is less time available for the laser beam 18 to scan the surface of the drum 12 and form the required dots. This is true because for a given speed of the drum 12 there is a set time between the scan of the beam 18 to form a first row of dots and the scan of the beam to form the next row of dots. The time available for the laser beam 18 to scan the surface and form dots is equal to the set time minus the turnaround time, and the longer turnaround time for the oscillating mirror makes this available time smaller and thus necessitates the beam move faster to form the required dots within this smaller time. The faster scanning of the laser beam 18 means the power of the laser beam 18 must be increased to sufficiently discharge regions on the surface of the drum to form the required dots. Higher power lasers for generating such a laser beam 18 are more expensive and thus undesirably increase the overall cost of the printer 10.

To alleviate the adverse affects of the increased turnaround time of oscillating mirrors, the laser beam 18 ideally could be reflected off the mirror 26 to "bidirectionally" scan the laser beam across the surface of the drum 12 from left-to-right and from right-to-left. Such bidirectional scanning is not used in printers 10 containing oscillating mirrors, however, because bidirectional scanning does not allow scaling of intensity data as required to compensate for variations in the oscillation frequency of the mirror as described above. This is true because bidirectional scanning of the laser beam 18 results in scan lines across the surface of the drum 12 that form a "zig-zag" pattern 304 on the surface as depicted in FIG. 3. More specifically, scan lines 306 of the laser beam 18 from left-to-right slant upward from left-to-right since the surface is moving as the beam 18 scans across the surface, as previously discussed. Conversely, if the beam 18 is being scanned bidirectionally then scan lines 308 of the laser beam 18 from right-to-left slant upward from right-to-left. When combined with variations in the oscillation frequency of the oscillating mirror, this zig-zag pattern 304 of the scan lines results in a variable overlap of dots in adjacent rows of dots being formed and thus does not allow for scaling of intensity data as described above for the constant overlap that is present in unidirectional scanning systems.

SUMMARY OF THE INVENTION

According to one aspect of the present invention, a scanning system is adapted to scan an image beam across a photoconductive surface. The scanning system includes an oscillating mirror and is operable to generate an image beam and to reflect the image beam off the oscillating mirror to discharge regions on the surface. The system is further operable to dynamically scale an intensity of the image beam as a function of a position of the image beam on the photoconductive surface.

According to another aspect of the present invention, a method of scanning an image beam with an oscillating mirror to discharge regions on a photoconductive surface includes scanning the image beam in a first direction across the surface to discharge regions on the surface. The image beam is scanned in a second direction across the surface to discharge regions on the surface. As the image beam scans in at least one of the first and second directions, an intensity of the image beam is dynamically scaled as a function of the position of the image beam.

DESCRIPTION OF THE INVENTION

Figure 4:
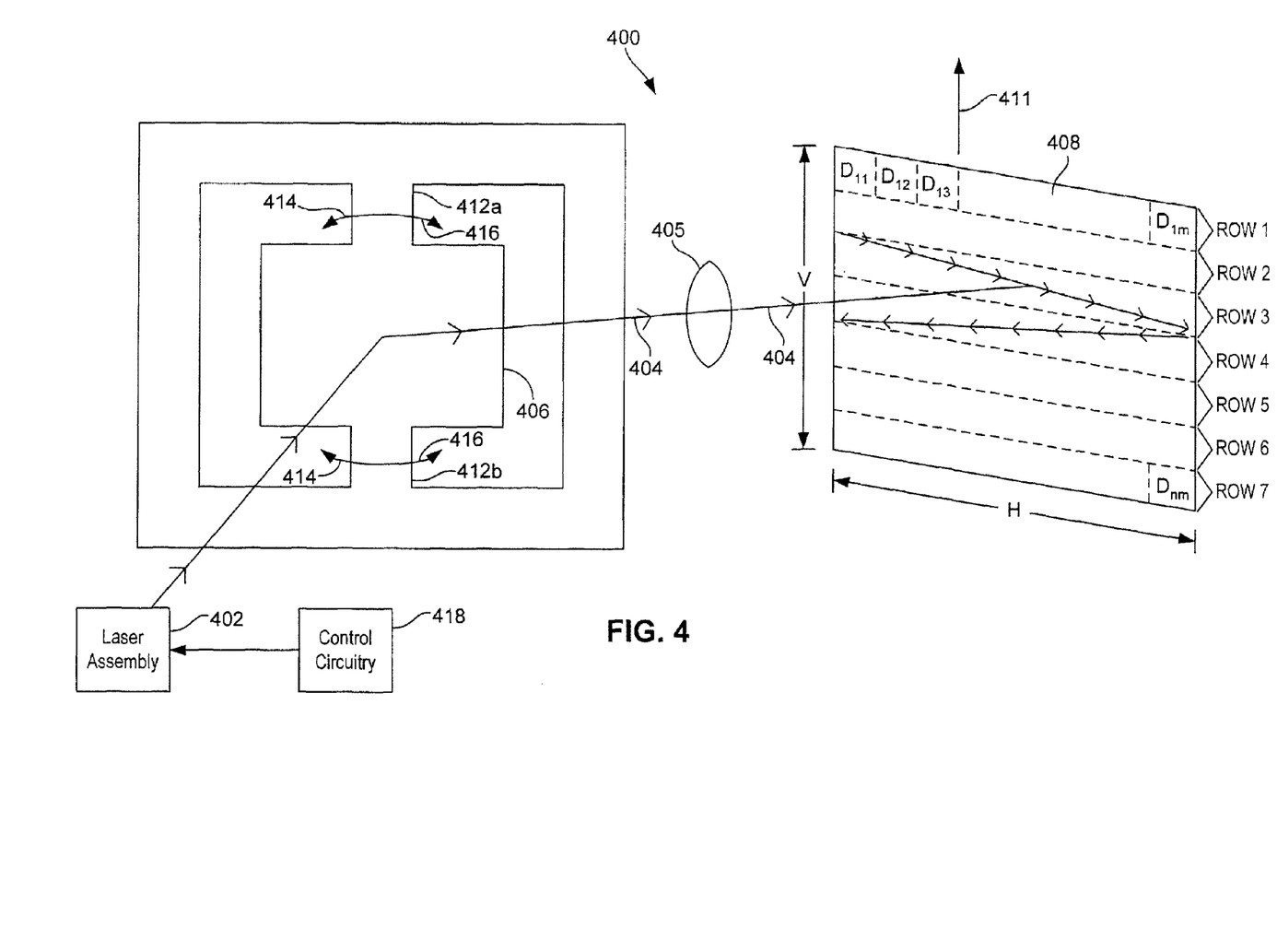
FIG. 4 is a functional diagram of an oscillating mirror laser scanning system including an oscillating mirror for bidirectionally scanning the laser beam across a surface of a photoconductive drum according to one embodiment of the present invention.

FIG. 4 is a functional diagram of an oscillating mirror laser scanning system 400 that includes a laser assembly 402 for generating a laser beam 404 and an oscillating mirror 406 for bidirectionally scanning the laser beam across a surface 408 of a photoconductive drum 410 according to one embodiment of the present invention. In operation, the mirror 406 oscillates to bidirectionally scan the laser beam 404 across the surface 408 as the surface moves upward 411 along a vertical dimension V during rotation of the drum 410. During this bidirectional scanning, the laser assembly 402 scales the intensity of the laser beam 404 to compensate for variations in the oscillation frequency of the mirror 406 and dynamically scales the intensity of the beam to compensate for slanted scanning resulting from the bidirectional scanning of the beam, as will be described in more detail below. The use of the oscillating mirror 406 lowers the cost of the scanning system 400 by replacing the more expensive rotating mirror and associated circuitry utilized in conventional laser printers. Moreover, the bidirectional scanning enables lower power and thus lower cost laser diodes to be utilized, eliminating the need for higher power laser diodes in systems using unidirectional scanning using oscillating mirrors.

The following discussion is presented to enable a person skilled in the art to make and use the invention. Various modifications to the preferred embodiments will be readily apparent to those skilled in the art, and the generic principles herein may be applied to other embodiments and applications without departing from the spirit and scope of the present invention as defined by the appended claims. Thus, the present invention is not intended to be limited to the embodiments shown and described, but should be accorded the widest scope consistent with the principles and features disclosed herein.

The laser beam 404 scans the surface 408 in a horizontal dimension H across the surface 408 of the drum 410. To scan the laser beam 404 in the horizontal dimension H, the oscillating mirror 406 rotates back and forth about pivot arms 412a and 412b. By rotating back and forth about the pivot arms 412a and 412b, the mirror 406 sweeps the laser beam 404 in the horizontal dimension H to develop negatively discharged regions or dots designated $D_{11}$-$D_{nm}$ on the surface 408. The dots $D_{11}$-$D_{nm}$ are formed in an array of n rows and m columns on the surface 408, with seven rows designated ROW1-ROW7 depicted on the surface in FIG. 4. After being reflected off the mirror 406, the laser beam 404 propagates through optics 405 positioned between the mirror and the surface 408. The function of the optics 405 is to change characteristics of the laser beam 408 to compensate for image distortion that would otherwise be caused by the varying distance between the mirror and points along the surface 408.

The scanning system 400 further includes control circuitry 418 that controls the overall operation of the system, such as controlling the laser assembly 402, controlling the oscillation of the mirror 406, monitoring or predicting the instantaneous rotational position of the mirror, and compensating for the variable velocity of the mirror as it sinusoidally rotates about the pivot arms 412a and 412b. The control circuitry 418 also includes other components of the system that need not be described in detail for an understanding of embodiments of the present invention, such as motor circuitry for controlling the rotation of the drum 410. Also note that the laser beam 404 is shown as a line in FIG. 4 merely for ease of depiction and actually has a finite beam width or diameter, as will be appreciated by those skilled in the art.

When referring to the dots $D_{11}$-$D_{nm}$ in the following description, the dots will be referred to simply as D when referring to any single one of the dots or groups of dots, such as dots in a given row ROW1-ROW7, while the subscripts n and m will be included when referring to a specific dot. The same is true of the rows ROW1-ROW7, with the number being omitted when referring to any of the rows and a number being used only when discussing a specific row. Also for ease of description, the laser beam 404 may be referred to as scanning across a given row of dots D even though, as described above, the laser beam actually scans across a given row on the surface 408 to thereby form the dots D in that row.

In operation, the scanning system 400 scans the laser beam 404 across the surface 408 in the horizontal dimension H as the mirror 406 rotates about the pivot arms 412a and 412b. The laser beam 404 starts at the dot $D_{11}$ in row ROW1 (not shown in FIG. 4) and proceeds from left-to-right, with the control circuitry 418 controlling the laser assembly 402 to sequentially modulate the intensity of the laser beam 404 as the beam scans across row ROW1 to successively form the dots $D_{11}$-$D_{1m}$. In the example of FIG. 4, the mirror 406 rotates about the pivot arms 412a and 412b in a direction 414 to scan the beam 404 from left-to-right. After formation of the dot $D_{1m}$, the control circuitry 418 momentarily turns OFF the laser assembly 402 to turn OFF the laser beam 404 as the mirror 406 reaches its maximum rotation about the pivot arms 412a and 412b in the direction 414.

Once the mirror 406 reaches its maximum rotation about the pivot arms 412a and 412b in the direction 414, the mirror 406 begins rotating the opposite way about the pivot arms 412a and 412b in a direction 416. At this point, the laser assembly 402 modulates the laser beam 404 under control of the control circuitry 418 to scan the laser beam across the dots D in rows ROW1 and ROW2. More specifically, the laser beam 404 starts at the dots $D_{1m}$ and $D_{2m}$ in rows ROW1 and ROW2 and proceeds from right-to-left, with the control circuitry 418 controlling the laser assembly 402 to sequentially modulate the intensity of the laser beam 404 as the beam scans across the rows ROW1 and ROW2 to successively discharge portions of the dots $D_{1m}$-$D_{11}$ and D2m-$D_{21}$. In the example of FIG. 4, the mirror 406 rotates about the pivot arms 412a and 412b in the direction 416 to scan the beam 404 from right-to-left. Note that the bidirectional scanning of the laser beam 404 results in overlapping scan lines for the dots D in adjacent rows ROW such that during each scan line of the laser beam 404 only a portion of the desired discharge for each dot D is removed, as will be described in more detail below.

The scanning system 400 continues operating in this way as the mirror 406 oscillates about the pivot arms 412a and 412b and the laser beam 404 scans from left-to-right and from right-to-left across the surface 408 of the drum 410 to sequentially form the dots D in each of the rows ROW1-ROW7. As the drum 410 rotates upward in the direction 411, additional rows (not shown) of dots D will of course be formed on the surface 408. FIG. 4 illustrates a left-to-right scan line of the laser beam 404 for row ROW3 and a right-to-left scan line for row ROW4. These scan lines are shown as lines merely to simplify this figure, with each scan line typically overlapping the dots in adjacent rows, as will be explained in more detail below.

Figure 5:
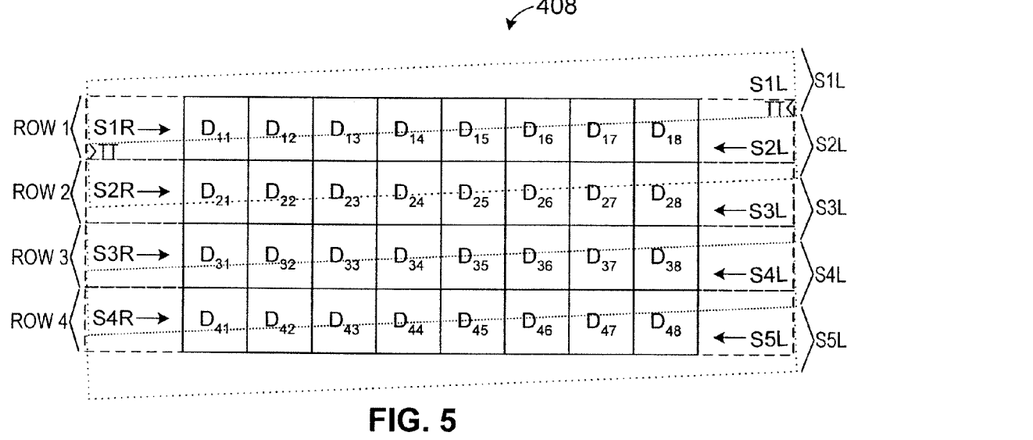
FIG. 5 is an example bidirectional scan line pattern generated by the scanning system of FIG. 4 when the oscillating mirror has the desired oscillation frequency.

The overall operation of the scanning system 400 will now be described in more detail with reference to FIG. 5, which is an example bidirectional scan line pattern generated on the surface 408 of drum 410 by the scanning system of FIG. 4 when the mirror 406 has the desired oscillation frequency. The diagram shows four rows ROW1-ROW4 of dots D corresponding to the rows of dots ideally formed by the scanning laser beam 404. Also shown are the actual left-to-right scan lines S1R-S4R of the laser beam 404 and the actual right-to-left scan lines S1L-S5L of the laser beam. In the example of FIG. 4, the actual left-to-right scan lines S1R-S4R are defined as being aligned perfectly with the dots D in the rows ROW1-ROW4. The actual right-to-left scan lines S1L-S5L are depicted with dotted lines. FIG. 5 illustrates a situation where the oscillation frequency of the mirror 406 is equal to the desired oscillation frequency. The affects of variations in the oscillation frequency of the mirror 406 will be discussed in more detail below with reference to FIGS. 8-13.

Figure 6:
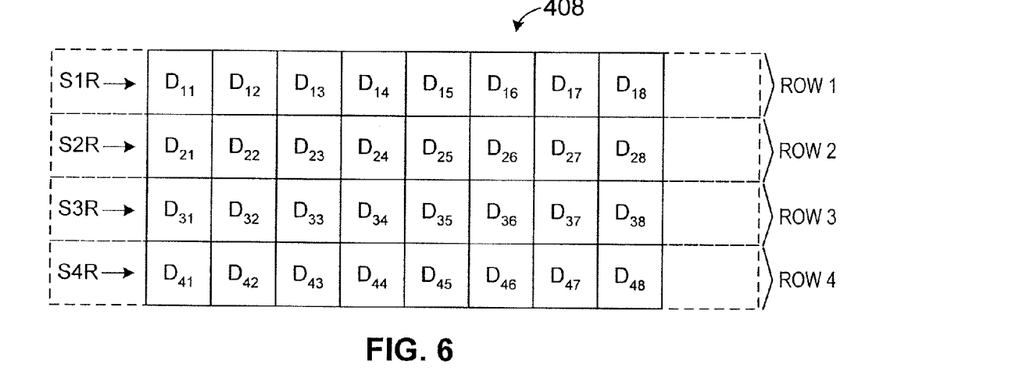
FIG. 6 is a scan line diagram showing only the horizontal left-to-right scan lines of FIG. 5.

In operation, the control circuitry 418 stores an array of pixels, each pixel containing intensity data of a corresponding dot D to be scanned onto the surface 408 of the drum 410. The control circuitry 418 utilizes the intensity data of each pixel to modulate the intensity of the laser beam 404 as a function of the position of the laser beam on surface 408, which is determined by the rotational position of the oscillating mirror 406, and thus as a function of the dot being formed. Initially, assume the laser beam 404 scans the scan line S1R from left-to-right across the row ROW1. The scan line S1R entirely covers the dots $D_{11}$-$D_{1m}$ and only these dots due to the oscillation frequency of the mirror 406 being equal to the desired oscillation frequency. This is shown more clearly in FIG. 6, which illustrates only the left-to-right scan lines S1R-S4R and shows that during the scan line S1R the laser beam 404 traverses only the dots D in row ROW1. As previously mentioned, the left-to-right scan lines S1R-S4R are defined as being aligned with the dots D in examples of FIGS. 5 and 6.

As the laser beam 404 traverses the scan line S1R, the control circuitry 418 controls the laser assembly 402 to modulate the intensity of the laser beam 404 based upon the intensity data of the corresponding pixels. The scan line S1R of the dots $D_{11}$-$D_{18}$ partially discharges the ones of these dots to be discharged. The dots are only partially discharged because, as previously mentioned, the laser beam 404 is moving faster when scanning the surface 408 with the oscillating mirror 406. This assumes the laser assembly 402 generates the laser beam 404 having a power that only partially discharges these dots D, which enables the use of a laser beam having the same power as in conventional laser printers. The lower power laser beam 404 means the laser assembly 402 only need include a less expensive laser generation source, such as a lower power laser diode, which reduces the cost of the system 400.

After the laser beam 404 has traversed scan line S1R, the mirror 406 turns around and begins moving in the other direction to scan the laser beam through the scan line S2L. The time it takes the mirror 406 to stop and turn around to begin moving in the other direction is referred to as the turnaround time. This turnaround time results in a gap, illustrated in FIG. 5 as TT, between the bottom of the scan line S1R and the top of the scan line S2L. This turnaround time and the resulting gap TT occurs each time the mirror 406 "turns around," meaning when the mirror stops moving in a given direction and begins moving in the opposite direction about the pivot arms 412a and 412b.

Figure 7:
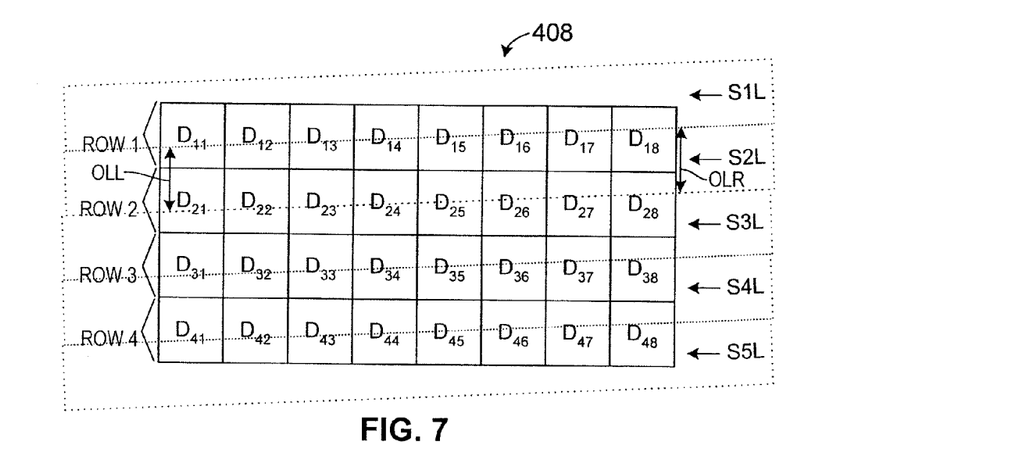
FIG. 7 is a scan line diagram showing only the slanted right-to-left scan lines of FIG. 5.

As the laser beam 404 traverses the scan line S2L the beam is slanted downward relative to the dots D, meaning the beam 404 passes over dots in both rows ROW1 and ROW2. As a result, the control circuitry 418 cannot simply use the intensity data for pixels in given row but instead must scale the intensity of the laser beam as a function of the position of the laser beam on the surface 408 and thus as a function of the dot D being formed. The control circuitry 418 scales the intensity of the laser beam 404 to partially discharge those dots being discharged in rows ROW1 and ROW2. FIG. 7 shows only the right-to-left scan lines S1L-S5L of the scan line pattern of FIG. 5 and more clearly shows that during the scan line S2L the beam 404 covers a portion of the dots $D_{18}$-$D_{11}$ in row ROW1 and a portion of the dots $D_{28}$-$D_{21}$ in row ROW2. Moreover, because the beam 404 is angled downward in the scan line S2L the portions of these dots D covered by the beam 404 or "overlap" of the beam varies as the beam scans from right-to-left. For example, as illustrated on the right of FIG. 7 a right-side overlap OLR of the beam 404 is shown. At this point, the beam 404 overlaps more of the dot $D_{18}$ than the dot $D_{28}$. By the time the beam 404 has reached the left side of scan line S2L, a left-side overlap OLL of the beam illustrates that the beam now overlaps more of the dot $D_{21}$ in row ROW2 than the dot $D_{11}$ in row ROW1. The overlap of the dots D in the rows ROW1 and ROW2 varies as a function of the dot being scanned due to the slanting of the beam 404 relative to the dots D during the scan line S2L.

The control circuitry 418 scales the intensity of the laser beam 404 using the intensity data for the pixels corresponding to the dots $D_{18}$-$D_{11}$ in row ROW1 and the dots $D_{28}$-$D_{21}$ in the row ROW2. In one embodiment, the control circuitry 418 generates an intensity value for the laser beam 404 using a weighted sum of the intensity data for the pixels corresponding to the pairs of dots D that the beam traverses during the scan line S2L. For example, when the laser beam 404 is at the far right corresponding to column 8 in the array of pixels, meaning at the dots $D_{18}$ and $D_{28}$, the control circuitry 418 calculates the intensity of the laser beam as equal to (0.66× $ID_{18}$+0.33× $ID_{28}$), where $ID_{18}$ and $ID_{28}$ correspond to the intensity data for the pixels corresponding to the dots $D_{18}$ and $D_{28}$, respectively. By the time the laser beam 404 is at the far left corresponding to column 1 in the array of pixels, meaning at the dots $D_{11}$ and $D_{21}$, the control circuitry 418 calculates the intensity of the laser beam as equal to (0.33× $ID_{11}$+0.66× $ID_{21}$), where $ID_{11}$ and $ID_{21}$ correspond to the intensity data for the pixels corresponding to the dots $D_{11}$ and $D_{21}$, respectively. Between columns 1 and 8 of dots D, the overlap of the beam 404 varies for each column and thus the control circuitry 418 dynamically calculates the intensity of the beam to appropriately weight the intensity data ID of the pixels corresponding to the dots in the column being scanned. In this way, the control circuitry 418 dynamically scales the intensity of the laser beam 404 as function of the position of the laser beam on the surface 408, which may be viewed as being a function of the dot currently being formed.

After the laser beam 404 has traversed scan line S2L, the mirror 406 once again turns around and begins moving in the other direction to cause the laser beam to traverse the scan line S2R. The scanning system 400 now operates as described for scan line S1R and the control circuitry 418 modulates the intensity of the beam to partially discharge the required ones of the dots $D_{21}$-$D_{28}$ in row ROW2. Next, the mirror 406 again turns around and begins scanning the laser beam 404 from right-to-left to traverse the scan line S3L and the control circuitry 418 once again dynamically scales the intensity of the beam using weighted intensity data ID for the appropriates pairs of dots D in rows ROW2 and ROW3. For each row ROW of dots D, the dots in that row that are being discharged are fully discharged after the laser beam 404 traverses those dots during three successive scan lines. For example, the ones of the dots $D_{21}$-$D_{28}$ in the row ROW2 that are being discharged are fully discharged after the laser beam 404 traverses these dots in the scan lines S2L, S2R, and S3L.

In other embodiments of the system 400, the weighting of the intensity data ID corresponding to adjoining rows ROW of dots D being scanned during the scan lines S1L-S5L may be scaled in a manner different than that described above. For example, non-linear interpolation utilizing intensity data ID of dots D surrounding pairs of dots actually being traversed may be utilized in calculating the intensity of the laser beam when scanning the pair of dots a given column. In one embodiment, the intensity data ID for a current dot D is based on data stored in a look-up table containing data for a group or area of surrounding dots, such as a 5×5 array of surrounding dots with the center dot being the current dot.

Figure 8:
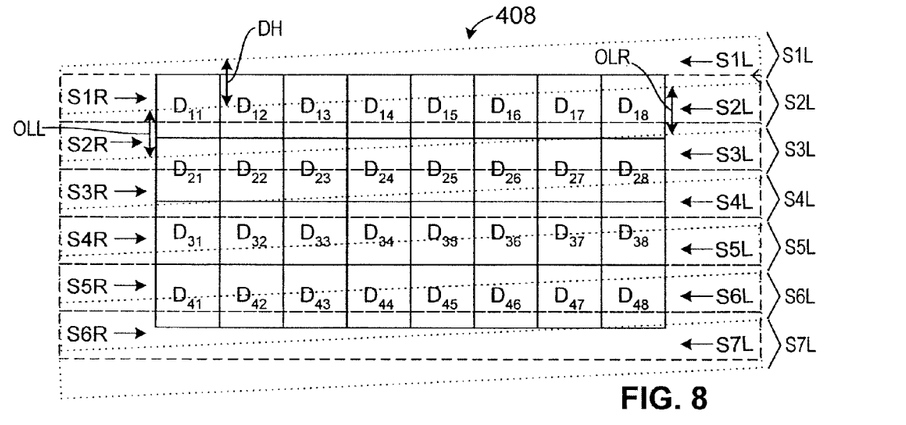
FIG. 8 is an example bidirectional scan line pattern generated by the scanning system of FIG. 4 when the oscillating mirror has an oscillation frequency that is greater than the desired oscillation frequency.
Figure 9:
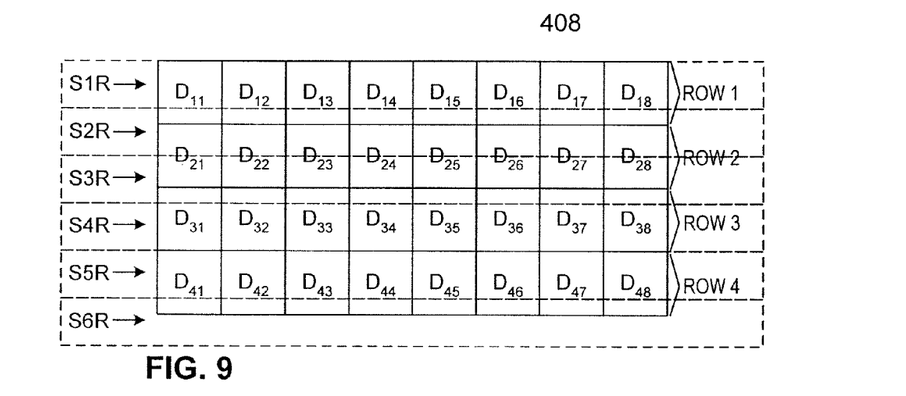
FIG. 9 is a scan line diagram showing only the horizontal left-to-right scan lines of FIG. 8.

The affect of variations in the oscillation frequency of the mirror 406 will now be described in more detail with reference to FIGS. 8-10. Operation of the scanning system 400 in properly forming the dots D on the surface 408 depends on the frequency of oscillation of the mirror 406 about the pivot arms 412a and 412b and the speed of rotation of the drum 410. For a given speed of rotation of the drum 410, the oscillation frequency of the mirror 406 must cause the laser beam 404 to scan from left-to-right across a given row ROW and then back from right-to-left in such a time that the laser beam is properly positioned to scan the next row from left-to-right as the surface 408 is moving.

Rather than being constant among mirrors 406, the oscillation frequency varies slightly from mirror to mirror. FIG. 8 is an example bidirectional scan line pattern generated by the scanning system 400 of FIG. 4 when the oscillating mirror 406 has an oscillation frequency that is greater than the desired oscillation frequency. In this situation, the laser beam 404 scans from left-to-right faster than is desired, meaning that the surface 408 has rotated upward in the direction 411 (see FIG. 4) less than it ideally should have when the laser beam begins scanning the next row. This faster than desired scanning of the laser beam 404 results in some of the scan lines S1R-S6R of the laser beam 404 overlapping adjacent rows ROW1-ROW4 of dots D, which is clearly shown in FIG. 9 depicting only the left-to-right scan lines S1R-S6R of FIG. 8. For example, actual scan line S1R of the laser beam 404 scans the row ROW1 while the next left-to-right scan line S2R of the laser beam 404 partially overlaps rows ROW1 and ROW2. A similar situation is seen for the actual scan lines S3R and S4R, namely scan line S3R partially overlaps rows ROW2 and ROW3 while scan line S4R scans only row ROW3. At this point the overlap pattern of adjacent scan lines S1R-S6R has repeated with the scan line S5R covering only row ROW4 in the same way as scan line S1R covers only row ROW1.

As a result of the actual scan lines S1R-S6R overlapping some of the rows ROW1-ROW4 of dots D, the desired dots will not be properly formed in each of the rows if the control circuitry 418 does not adjust the intensity of the laser beam 404 to compensate for this overlap. This is true because the overlapping scan lines S1R-S6R may result in the discharge for some of the dots D in a given row ROW being different than the desired discharge. For example, if the dot $D_{12}$ is not to be discharged (laser beam 404 turned OFF when scanning this dot) while the dot $D_{22}$ just below this dot is to be discharged, then the scan line S2R will undesirably result in partial discharge of the dot $D_{12}$.

To compensate for this undesirable discharge due to overlapping scan lines S1R-S6R, the scanning system 400 scales the data for each dot D as previously described above with reference to FIGS. 5-7. The intensity of the laser beam 404 for a given dot D is a weighted value of the intensity of the corresponding pixel in a first row ROW and the corresponding pixel just below that pixel in the next row. For example, with scan line S1R the intensity of the beam 404 is determined entirely by the intensity data ID of the pixels corresponding to dots $D_{11}$-$D_{18}$ in row ROW1 while for scan line S2R the intensity of the beam 404 is a scaled value determined by the intensity data for the pixels corresponding to the dots $D_{11}$-$D_{18}$ in row ROW1 plus the intensity data for the pixels corresponding to the dots $D_{21}$-$D_{28}$ in row ROW2. This scaling of the intensity of the laser beam 404 is the same for each pair of dots D in rows ROW1 and ROW2 during the scan line S2R due to the constant overlap of the scan line. This is true for all scan lines S1R-S6R although the specific constant weighting factors for a given scan line S1R-S6R varies for consecutive left-to-right scan lines. In this example, the scaling repeats every fourth left-to-right scan line S1R-S6R, as is seen in FIG. 9 by noting that the overlap for scan line S1R is the same as that for scan line S5R for the associated rows.

Figure 10:
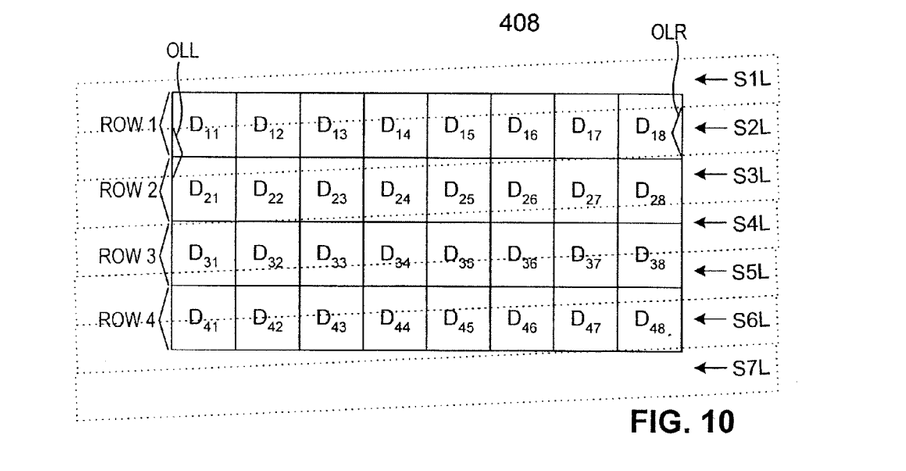
FIG. 10 is a scan line diagram showing only the slanted right-to-left scan lines of FIG. 8.

FIG. 10 is a scan line diagram showing only the right-to-left scan lines S1L-S7L of FIG. 7. The slanting of the actual scan lines S1L-S7L relative to the ideally formed array of dots D is more clearly seen in FIG. 10. Also shown is the varying overlap between adjacent rows ROW of dots D that results from the slanted right-to-left scan lines S1L-S7L. More specifically, a right-side overlap OLR of the scan line S2L indicates that on the far right side of this scan line the laser beam 404 traverses only the dots D in the row ROW1. Conversely, by the time the laser beam 404 has traversed the scan line S2L to the far left side of this scan line the left-side overlap OLL indicates that the laser beam traverses dots D in both rows ROW1 and ROW2. As the laser beam 404 progresses from right-to-left this overlap is dynamic as previously discussed with reference to FIG. 7. FIGS. 8-10 illustrate the situation where the oscillation frequency of the mirror 406 is faster than desired, although those skilled in the art will appreciate that similar changes result to the scan line pattern generated by the bidirectionally scanning laser beam 404 in the system 400 of FIG. 4 when the oscillation frequency is slower than desired. In the situation where the oscillation frequency is slower than desired, note that there could be times when the laser beam 404 overlaps more than two rows ROW of dots D.

Figure 11:
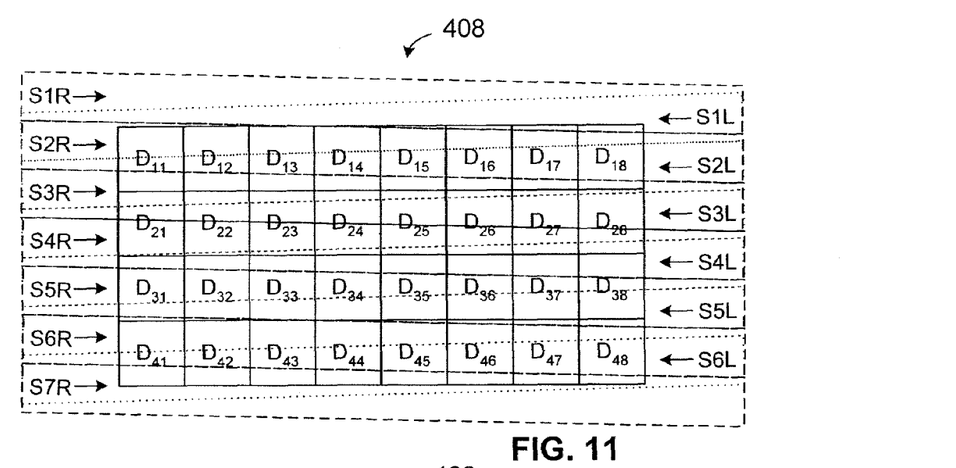
FIG. 11 is an example bidirectional scan line pattern generated by the scanning system of FIG. 4 according to another embodiment of the present invention.
Figure 12:
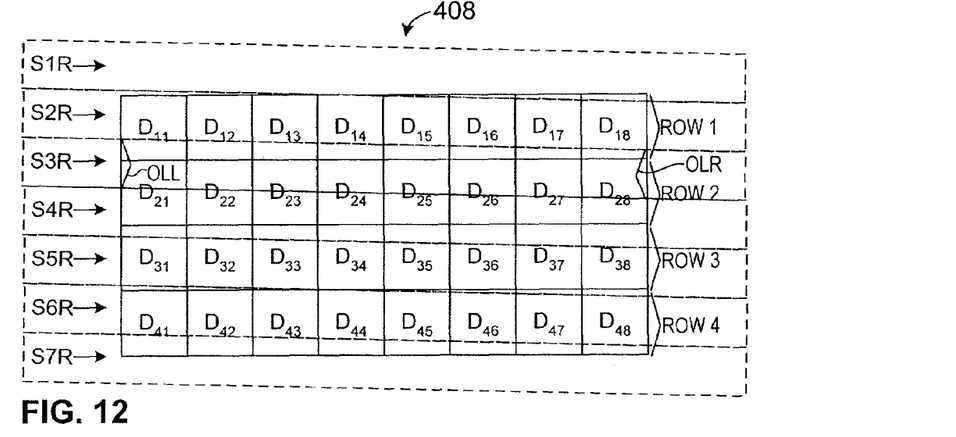
FIG. 12 is a scan line diagram showing only the slanted left-to-right scan lines of FIG. 11.
Figure 13:
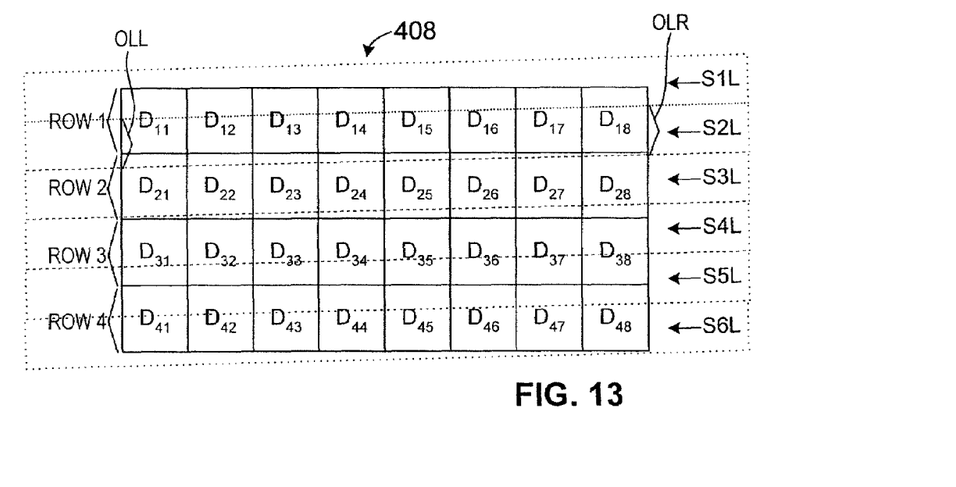
FIG. 13 is a scan line diagram showing only the slanted right-to-left scan lines of FIG. 11.

FIGS. 11-13 show actual scan line patterns generated by the scanning system 400 of FIG. 4 according to another embodiment of the present invention. In this embodiment of the system 400, each of the left-to-right scan lines S1R-S7R and each of the right-to-left scan lines S1L-S6L is defined as having a slant relative to the dots D. This means that in the embodiment of FIGS. 11-13 the control circuitry 418 dynamically scales intensity data for both the scan lines S1R-S7R and S1L-S6L since the overlap of dots D in adjoining rows ROW varies as a function of the position of the beam 404 on the surface 408 or as a function of the specific dots being traversed.

FIG. 11 shows the overall scan line pattern generated by the bidirectional scanning of the laser beam 404. Both the left-to-right scan lines S1R-S7R and the right-to-left scan lines S1L-S6L are slanted relative to the dots D ideally formed on the surface 408. FIG. 12 depicts only the left-to-right scan lines S1R-S7R and shows for the scan line S3R, for example, the variable overlap between the dots in the rows ROW1 and ROW2. A far-left overlap OLL and far-right overlap OLR are shown for scan line S3R, with the overlap dynamically varying between these two values as a function of the dots D being traversed. FIG. 13 depicts only the right-to-left scan lines S1L-S6L and shows for the scan line S2L, for example, the variable overlap between the dots in the rows ROW1 and ROW2. A far-right overlap OLR and far-left overlap OLL are shown for scan line S2L, with the overlap dynamically varying between these two values as a function of the dots D being traversed.

Notice that in the embodiment illustrated by FIGS. 11-13 that the amount of slant of the left-to-right scan lines relative to the amount of slant of the right-to-left scan lines has not changed when compared to the prior embodiment discussed with reference to FIGS. 5-10. Only the definition of these scan lines relative to the dots D has changed, which results in the control circuitry 418 applying a different algorithm in scaling the intensity of the laser beam 404 when forming the dots D.

In the previously described embodiment, the control circuitry 418 is described as scaling the intensity of the laser beam 404 to compensate for the slanted scan lines caused by the bidirectional scanning and for variations in the frequency of oscillation of the mirror 406. In general, the control circuitry 418 can control the intensity of the laser beam 404 in two ways: 1) by adjusting the power of the laser beam 404; or 2) by adjusting the time the laser beam 404 is ON or OFF as the beam traverses each of the dots D. Thus, "scaling the intensity" of the laser beam 404 includes time modulating the laser, namely turning the laser beam ON and OFF, while utilizing the appropriate intensity data ID to vary the duration of the time the laser beam is ON and OFF. With time modulation when the laser beam 404 is turned ON the power of the laser beam 404 is constant and does not vary. Thus, the discharge of dots D by the laser beam 404 is determined by a varying time for which the laser beam is turned ON and OFF, with this varying time having a value determined the intensity data ID of the appropriate pixels. For example, if a given dot D is to be discharged by only one-half of a fully discharged dot, the laser beam 404 may be turned ON for only one-half the time that the beam traverses that dot. The control circuitry 418 can do this in many different ways, such as turning ON the laser beam 404 for just the left side, right side, or center of the dot D, or the control circuitry can turn the laser beam ON for ¼ on the left side and ¼ on right side, or just turn laser beam ON and OFF several times as the beam traverses the dot to more evenly distribute less than a maximum amount of light across the dot. Alternatively, the control circuitry 418 can vary the power and time of the laser beam 404 utilizing the appropriate intensity data ID. In a further embodiment, the control circuitry 418 varies only the power of the laser beam 404 using the appropriate intensity data ID. In yet another embodiment of the system 400, the control circuitry 418 occasionally determines the oscillation frequency of the mirror 406 and after determining the current oscillation frequency of the mirror, dynamically scales an intensity of the laser beam 404 as function of the difference between the determined oscillation frequency and a desired oscillation frequency of the mirror.

It should be noted that the scan lines and arrays of dots D in the examples of FIGS. 5-10 assume a perfect linear discharge of the photoconductive drum 410 and a perfectly uniform laser beam 404. The actual discharge pattern formed by the dots D may be different due to nonlinear discharge of regions on the drum 410 and due to a nonuniform intensity profile for the laser beam 404, which would typically be a Gaussian intensity distribution. All examples discussed above assume a perfect discharge and perfectly uniform laser beam to simplify the examples and allow the concepts of bidirectional scanning, constant intensity data scaling to account for overlap due to variations in oscillation frequency of the mirror 406, and dynamic intensity data scaling to compensate for slanted scanning that results with bidirectional scanning to be more easily described under these ideal operating conditions.

From the foregoing it will be appreciated that, although specific embodiments of the invention have been described herein for purposes of illustration, various modifications may be made without deviating from the spirit and scope of the invention. For example, although the beam being utilized to discharge the photoconductive drum has been described as a laser beam, other light generating sources may be used as well if suitable in particular applications. Thus, the term laser beam is not limited to a beam of light generated by a laser but instead should be construed broadly as an image beam that is a suitable electromagnetic beam generated by any suitable means in a given printer application.

What is claimed is:

1. A controller for use in a bi-directional scanning system adapted to scan an image beam across a photoconductive surface in a first scan direction and a second scan direction, the controller configured to:
control an image beam generator to generate the image beam;
control an oscillating mirror configured to bi-directionally scan the image beam across the photoconductive surface to discharge regions on the photoconductive surface, the discharged regions comprising dots aligned along a plurality of substantially parallel rows; and
scale an intensity of the image beam to compensate for a slant relative to the plurality of substantially parallel rows in a scan moving in at least one of the first or second scan directions.

2. The controller of claim 1, wherein the image beam generator comprises a laser assembly and the image beam is a laser beam.

3. The controller of claim 1, wherein the laser assembly comprises a laser diode.

4. The controller of claim 1, wherein the controller is further configured to dynamically scale the intensity of the image beam in only one of the first or second scan directions.

5. The controller of claim 1, wherein the first scan direction is a direction substantially from left-to-right across the photoconductive surface and the second scan direction is a direction substantially from right-to-left across the photoconductive surface.

6. The controller of claim 1, wherein the controller is further configured to dynamically adjust the intensity of the image beam based on a power of the image beam.

7. The controller of claim 1 wherein the controller is further configured to dynamically adjust the intensity of the image beam based on a time modulation of the image beam.

8. The controller of claim 1, wherein the controller is further operable to store an array of pixel data, the array of pixel data comprising a plurality of rows and columns of data for pixels corresponding to dots to be scanned on the photoconductive surface, and wherein the controller is operable to scale the intensity of the image beam to form a dot in a given row by summing a variable fraction of intensity data for pixel data corresponding to the dot in that given row and a variable fraction of intensity data for a pixel in a same column in an adjacent row.

9. The controller of claim 8, wherein the controller is further configured to perform non-linear interpolation based on intensity data for a plurality of pixels corresponding to neighboring dots surrounding the dot to determine the intensity of the image beam for forming the dot.

10. The controller of claim 8, wherein the controller is further configured to scale the intensity of the image beam only for scans in the first scan direction.

11. The controller of claim 8, wherein each scan of the image beam that traverses the dot discharges a portion of a desired charge from the dot.

12. The controller of claim 11, wherein the controller is further configured to fully discharge the desired charge with three scans of the dot.

13. The controller of claim 11, wherein the controller is further operable to determine an oscillation frequency of the oscillating mirror and dynamically scale the intensity of the image beam as a function of a difference between the determined oscillation frequency and a desired oscillation frequency.

14. The controller of claim 1, wherein the oscillating mirror comprises an MEMS mirror.

15. A circuit for controlling scanning of an image beam with an oscillating mirror, the circuit comprising:
   a controller adapted to:
      scan the image beam in a first direction across a photoconductive surface to discharge regions on the photoconductive surface;
      scan the image beam in a second direction across the photoconductive surface; and
      scale an intensity of the image beam to compensate for a slant relative to a plurality of substantially parallel rows in a scan moving in at least one of the first or second directions.

16. The circuit of claim 15, wherein the image beam comprises a laser beam and wherein the controller is adapted to control movement of the laser beam in the first and the second directions.

17. The circuit of claim 15, wherein the controller is adapted to dynamically scale the intensity of the image beam only as the image beam scans in the first direction.

18. The circuit of claim 15, wherein the controller is adapted to adjust a power of the image beam.

19. The circuit of claim 15, wherein the controller is adapted to dynamically scale the intensity of the image beam based on a time modulation of the image beam while keeping the image beam at a substantially constant power.

20. The circuit of claim 15, wherein the controller is adapted to, during scanning of the image beam in the first direction for each dot in a given row of dots being scanned, scale the intensity of the image beam to form a dot in a given row by summing a variable fraction of intensity data for pixel data corresponding to the dot in that given row and a variable fraction of intensity data for a pixel in a same column in an adjacent row.

21. The circuit of claim 20, wherein the controller is adapted to dynamically scale the intensity of the image beam by performing non-linear interpolation based on intensity data for a plurality of pixels corresponding to neighboring dots surrounding the dot to determine the intensity of the image beam for forming the dot.

22. The circuit of claim 15, wherein the controller is configured to discharge a portion of a desired charge from a discharge region when scanning the image beam in the first direction.

23. The circuit of claim 22, wherein the controller is further adapted to fully discharge the desired charge from the discharge region with three scans of the image beam.

24. The circuit of claim 15, wherein the controller is adapted to dynamically scale the intensity of the image beam as a function of a difference between a determined oscillation frequency and a desired oscillation frequency.

* * * * *